United States Patent [19]
Allen et al.

[11] Patent Number: 5,859,388
[45] Date of Patent: Jan. 12, 1999

[54] SPLICE CLOSURE

[75] Inventors: Robert James Allen, Queensland, Australia; Robert Vanhentenrijk, Herent, Bulgaria; Alain Wambeke, Zoutleeuw, Bulgaria; Jean-Marie Etienne Nolf, Korbeek-Lo, Bulgaria

[73] Assignee: N.V. Raychem S.A., Kessel-Lo, Bulgaria

[21] Appl. No.: 765,156
[22] PCT Filed: Jun. 7, 1995
[86] PCT No.: PCT/GB95/01316
§ 371 Date: Mar. 24, 1997
§ 102(e) Date: Mar. 24, 1997
[87] PCT Pub. No.: WO95/34930
PCT Pub. Date: Dec. 21, 1995

[30] Foreign Application Priority Data

Jun. 10, 1994 [GB] United Kingdom .................... 9411738

[51] Int. Cl.⁶ .................................................. H02G 15/04
[52] U.S. Cl. ............................ 174/77 R; 174/91; 277/605
[58] Field of Search ............................. 174/91, 93, 74 A, 174/77 R, 82; 277/605, 602, 616, 617

[56] References Cited

U.S. PATENT DOCUMENTS

| | | | |
|---|---|---|---|
| 1,834,864 | 12/1931 | Philips | 174/91 X |
| 3,187,088 | 6/1965 | Warner | 174/91 |
| 3,518,600 | 6/1970 | Urani | 174/91 X |
| 4,685,683 | 8/1987 | Hall et al. | 277/605 X |
| 4,790,544 | 12/1988 | Kemp | 277/605 X |
| 4,924,034 | 5/1990 | Truesdale et al. | 174/74 A X |
| 5,247,974 | 9/1993 | Sargent et al. | 141/287 |
| 5,520,974 | 5/1996 | Chiotis et al. | 174/93 X |
| 5,560,618 | 10/1996 | Wambeke et al. | 277/1 |
| 5,562,295 | 10/1996 | Wambeke et al. | 277/34 |

FOREIGN PATENT DOCUMENTS

| | | |
|---|---|---|
| GBA2 151 723 | 7/1985 | European Pat. Off. . |
| GBA2 210 736 | 6/1989 | European Pat. Off. . |
| WOA93 14335 | 7/1993 | WIPO . |
| WOA93 17477 | 9/1993 | WIPO . |

Primary Examiner—Dean A. Reichard
Attorney, Agent, or Firm—Herbert G. Burkard

[57] ABSTRACT

An environmentally sealed cable splice includes (a) a butt cable splice between at least two substantially side-by-side cables, (b) an enclosure sealed around said cables, the enclosure including (i) a first part through which the cable extends, and (ii) a second part which is hollow and together with the first part forms a closed space, the first and second parts having internal and external cross-sections such that one can be slid upon the other so as to give an overlap between the first and second parts, and (c) an inflated sealing member carrying sealing material, the sealing member being within the enclosure and in contact with the cables and the overlap.

11 Claims, 2 Drawing Sheets

SPLICE CLOSURE

BACKGROUND OF THE INVENTION

The present invention relates to closures for environmental protection of butt splices in cables (i.e. a splice in which the cables are aligned end to end facing in the same direction), and to cable splices incorporating such closures.

U.S. Pat. No. 4,924,034 discloses an enclosure for providing environmental sealing around a cable butt splice. The enclosure disclosed has a first tubular part through which the cables extend and an outlet in that tubular part through which they enter and leave the enclosure. The enclosure also has a second part which is hollow and closed at the end remote from the first part. When first installed around a butt splice the enclosure is a single unit in which the first and second parts are Joined together, but if it becomes necessary to obtain access to the cable splice after the enclosure has been installed, this is done by cutting the enclosure along a line between the first and second parts, and removing the second part. The relative sizes of the first and second parts are arranged such that, after cutting the enclosure, it can be reconstituted by sliding the second part into or over the first part. The two parts have flanges which may be clamped together when the first and second parts have been slid together, and a sealing washer may be provided to give an improved seal between the flanges. Sealing of the cables passing through the outlet of the enclosure is obtained by providing a heat-recoverable portion of the outlet.

The present invention provides similar telescoping parts of a cable enclosure. In the present invention, however, sealing both (i) between the telescoping parts of the enclosure, and (ii) between the cables and the enclosure, is achieved using an inflatable sealing member within the enclosure.

Inflatable sealing members are known. It has been proposed, for example, to seal ducts carrying cables, e.g. telecommunications cables by using inflatable sealing members within the ducts. The inflatable sealing members may carry sealing material (e.g. mastics, gels) which come into contact with the duct or cables within the duct when the sealing member is inflated. Such a sealing system is disclosed for example in WO092/19034 and WO094/05943, the entire disclosures of which are incorporated herein by reference.

WO 92/19034 describes an inflatable envelope, the envelope being inflated in use by introducing a pressurising medium into the envelope through a hole in the walls of the envelope by means of a probe passing through the hole, and a gel material being provided to seal that hole on withdrawal of the probe. This inflatable envelope may be used to form a seal between a single cable passing through a duct by wrapping the envelope around the cable, inserting the envelope-wrapped cable into the duct, and then inflating the envelope. Similarly for two cables in the duct, or in a splice, two of the said envelopes can be wrapped around the cables, and between the cables before inflation.

Where there are multiple cables passing through a duct it is also known from British Patent Application 9403838 to use one or more devices capable of co-operating with an outer pressure member (e.g. an inflatable envelope or sealing member of the type described in WO92/19034) to form a sealing block between the cables and the duct. The devices used and described typically comprise (i) an elongate support member and (ii) two flexible mastic leaves secured relative to and extending laterally of the elongate support member. In use, the devices are positioned between the cables and co-operate with the action of the outer pressure member to form a sealing block between the cables and the duct. Where there are up to four cables entering the duct a single device may be used in combination with the outer pressure member, but where there are five or more cables, two or more of such devices may be used.

As mentioned above the enclosure of U.S. Pat. No. 4,924,034 relies on the application of heat to ensure sealing of the cables to the enclosure (using heat recoverable material at the outlet to the closure). In some situations the use of heat is undesirable, as the cables may be sensitive to heat. Also the enclosure of U.S. Pat No. 4,924,034 is not reusable as such. The first time a re-entry has to be made it is necessary to cut the closure into two sections. This has to be done at the location at which the enclosure is installed. If additional cables have to be inserted then heat shrink material sealing the original cables will have to be cut away. Re-sealing the enclosure after re-entry will then involve two separate sealing operations, with two separate sealing components (one at the junction between the two closure parts, and the other around the cables at the outlet).

SUMMARY OF THE INVENTION

The present invention provides an improved enclosure for protecting butt spliced cables which does not require heat for sealing. It also provides an arrangement with which all the sealing required (i.e. both between the cables and the enclosure and between different parts of a split enclosure) can be achieved in a single operation.

A first aspect of the present invention provides an environmentally sealed cable splice which comprises:
 (a) a butt cable splice between at least two substantially side-by-side cables,
 (b) an enclosure sealed around said cables, the enclosure comprising
  (i) a first part through which the cable extends, and
  (ii) a second part which is hollow and together with the first part forms a closed space,
  the first and second parts having internal and external cross-sections such that one can be slid upon the other so as to give an overlap between the first and second parts, and
 (c) an inflated sealing member carrying sealing material, the sealing member being within the enclosure and in contact with the cables and the overlap.

A second aspect of the present invention provides a two part environmental closure for a cable butt splice comprising a first part, through which the cable extends, shaped to receive an inflatable sealing member at an end remote from that at which cable enters, and a second part adapted to be slid into engagement with the first part and shaped so as to receive a part of the sealing member.

A third aspect of the present invention provides a kit-of-parts for providing an environmental seal to a cable butt splice which comprises:
 (a) an environmental enclosure having two separate parts;
  (i) a first part through which cables extend from an outlet,
  (ii) a second part which is hollow and which together with the first part forms a closed space within which, in use, lies the cable splice, the second part being shaped so as to be slid into engagement with the first part so that there is an overlap between the first and second parts, and
 (b) an inflatable seal carrying a sealing material, the first and second parts being shaped so as to receive the inflatable seal so that it extends across the overlap whereby the overlap and any cables within the enclosure are sealed when the sealing means is inflated.

In a preferred embodiment the kit of parts also comprises one or more inter-cable devices capable of co-operating with the inflatable seal to form a sealing block across the enclosure around the cables. The or each device preferably comprises an elongate support member and two or more elongate flexible leaves each of which comprises a sealing material that is not heat fusible (and is preferably a mastic), and is secured relative to and extends laterally of the elongate support member. The device is positioned in use so that a first of the flexible leaves extends at least part of the way around a first cable, and a second of the leaves extends at least part of the way around a second cable, so that in co-operation with the inflatable seal a sealing block is made between the cables and the enclosure. The inflating of the seal urges the non-heat fusible sealing material on the devices around the cables, and itself into contact with the cables and the enclosure parts.

The above described devices are preferably also included in the other aspects of the invention. Preferably these devices are as described in GB 9403838

A further aspect of the invention provides a method for providing an environmental seal around a cable butt splice using a kit of parts according to the invention, the method comprising positioning the inter-cable devices, if present, between and around the cables, positioning the inflatable seal around the cables within the first and second enclosure parts, then telescopically sliding the enclosure parts together, and finally inflating the inflatable seal.

The inflatable seal used in any aspect of the invention is preferably as described in WO92/19034.

It is possible to arrange for the second part of the enclosure (the outer end or top) to slide inside the first part (through which the cable enters). However it is preferred for the second part to be outside the first part so that the first part will tend to be forced outwards by the inflatable sealing member against the second part.

In order to improve sealing between the first and second part of the enclosure it is preferred for the end of the wall of the inner part, where it overlaps with the outer part to be tapered such that it will move outward when the inflatable member is inflated, into contact with the outer part. This advantageously substantially prevents loss of any sealing material, e.g. mastic which is preferably coated on the outer surface of the inflatable seal. Where, as preferred, the inner part is the first part, the wall of the first part of the enclosure will have the taper. The angle of taper is preferably less than 30°.

The first part may be provided with means, e.g. an expanded portion, rib, or flange, substantially to limit the distance of movement of the second part towards the first part.

The first part preferably has an opening through which the cable extends into the enclosure, which opening decreases in cross-sectional area towards the interior of the enclosure (i.e. towards the second part). This shaping provides guidance for the cables and may help to protect them against damage against the edge of the outer opening. Such an arrangement is not easily provided in the known enclosures in which sealing of the cables is carried out using a heat-recoverable sleeve.

It will generally be convenient for the parts of the enclosure to have a circular cross-section.

In a preferred form of enclosure the first part has two sub-parts, (a) a cable entry sub-part, which has a cross-section sufficient to receive the cables to be spliced, and (b) a sealing sub-part, having a greater cross-sectional area for receiving an inflatable sealing means. This helps to locate the inflatable sealing means in the correct position so that there is sufficient overlap between the inflatable sealing means and the second part.

The sealing means preferably extends substantially equally into the first and second parts.

The enclosure may be conveniently produced as a single moulding which is cut into the parts before use. Any taper which is desirable may be provided, as part of the moulding, or after the cutting operation.

BRIEF DESCRIPTION OF THE DRAWINGS

The invention will now be described with reference to the accompanying drawings in which.

DESCRIPTION OF THE PREFERRED EMBODIMENTS

Figure 1:
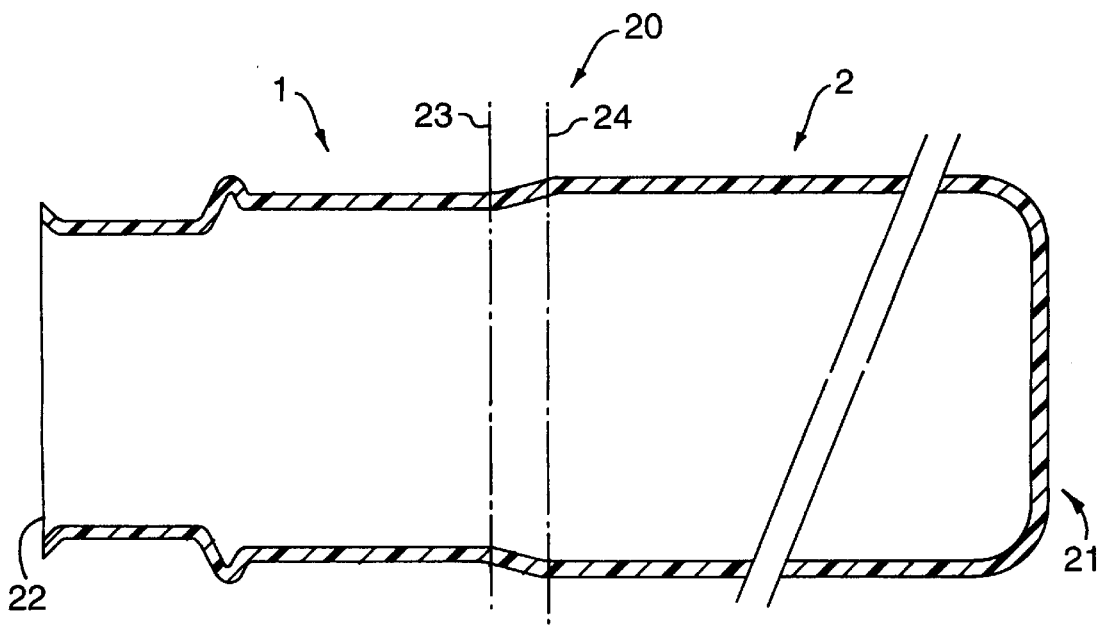
FIG. 1 shows the enclosure, as moulded, in longitudinal-section, with a portion omitted.

The initial tubular moulding 20 shown in FIG. 1 is generally cylindrical in shape, comprising a closed end 21, and an open end 22. The moulding is cut along planes 23 and 24 to form two distinct parts 1 and 2. These are shown and described in more detail with reference to FIG. 2. The moulding may be made from any material suitable for making splice enclosures for example high density polyethylene (HDPE). The moulding will generally be opaque, to give protection against light and because opaque material is usually cheaper. Examples of wall thicknesses which can be used are those of about 4 to 5 mm.

Figure 2:
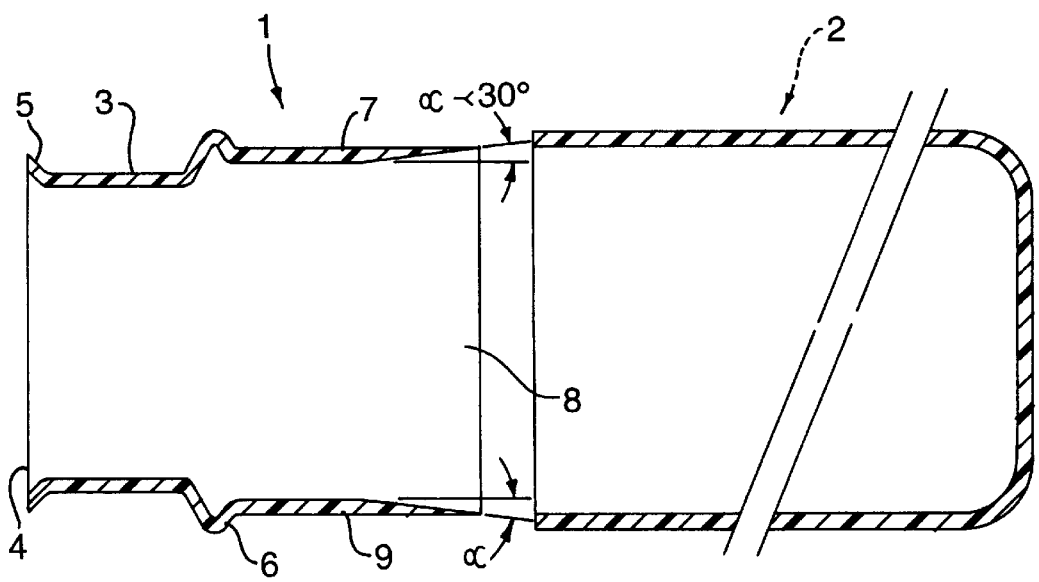
FIG. 2 shows the moulded enclosure of FIG. 1, after division into two parts, again in longitudinal-section with a portion of one part omitted.

In FIG. 2 the initial tubular moulding of FIG. 1 is shown divided into two separate parts 1 and 2. Part 1 has a smaller diameter than part 2. The first part 1 also has a sub-part 3 of narrower diameter having an opening 4 through which cables can be inserted for splicing. This opening is preceded by a portion 5 whose diameter increases towards the first exit from the enclosure. Portion 5 helps to guide cables into the enclosure. Sub-part 3 of part 1 is separated by a circumferential rib 6 (the purpose of which is described later) from the remaining part 7 of part 1. The remaining part 7 of part 1 has a greater diameter than sub-part 3 of part 1. Sub-part 7 is intended to receive an inflatable sealing means (shown in FIG. 3). Sub-part 7 terminates in an opening 8 (produced by cutting the original moulding along line 23). At the opening 8, the walls 9 of sub-part 7 which surround this opening are cut into a tapered configuration. The angle of taper is indicated by the Greek letter alpha, and is preferably less than 30°.

The second part 2 of the enclosure, (produced by cutting the original moulding along line 24) has an inside diameter just sufficiently large to fit around the outside diameter of sub-part 7 of part 1. It can be slid along the sub-part 7 until it is stopped by the rib 6.

Figure 3:
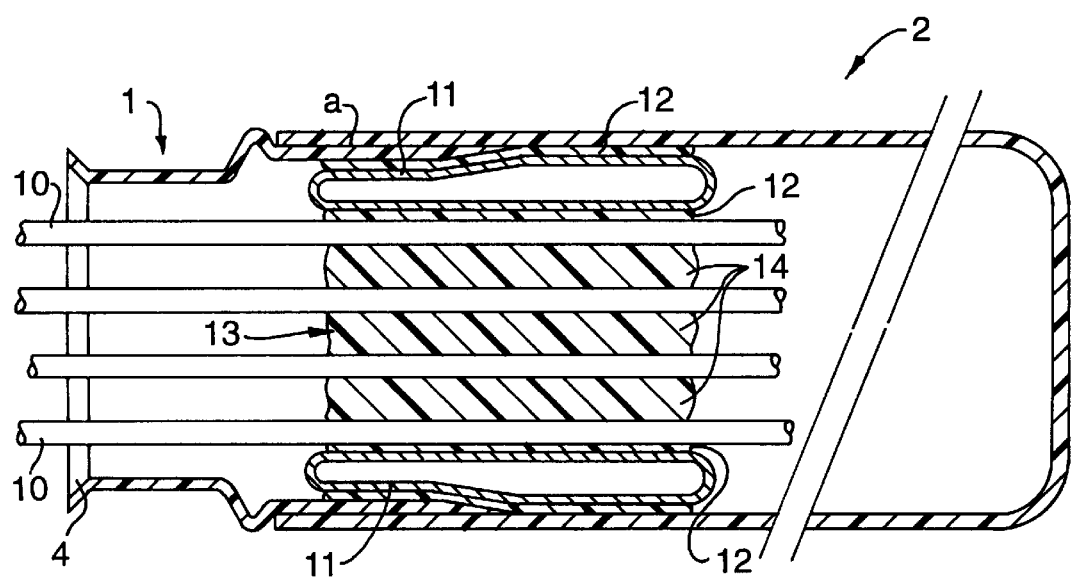
FIG. 3 shows a longitudinal-sectional view of the assembled enclosure of FIG. 2, with cables and sealing means in place.

FIG. 3 shows the enclosure of FIG. 2 after assembly, in combination with a sealing member, onto a cable splice. A plurality of cables 10 extend through the cable exit 4 in part 1 of the enclosure and extend into part 2 of the enclosure where they are joined by splices (not shown). An inflatable sealing member in the form of an envelope 11 (shown inflated) is located partly within sub-part 7 of part 1 and partly within part 2 of the enclosure. The sealing member carries a sealing material (e.g. a water curable mastic) 12 on its external surface. A sealing device 13 with mastic leaves 14 is positioned between the cables 10 within the sealing envelope 11.

The inflatable sealing envelope 11 is shown inflated. It has urged its own mastic coating into contact with the outer enclosure parts 1 and 2, over the tapered end of the walls 9. It has also urged the cables 10 radially inward and the mastic leaves 14 of the device 13 around and between cable 10.

The sealing material 12 extends over the internal joint between parts 1 and 2 of the enclosure, and also extends between the cables 10 and the sealing member 11, to enhance the seal around the cables and within the enclosure parts 1 and 2.

In combination with the sealing device 13 between the cables, in a single operation, inflation of the sealing member 11 effects a seal not only of the joint between the two parts of the enclosure but also across the openings between the cables and the surrounding enclosure.

If it is necessary to re-enter the enclosure the inflated sealing member can be deflated, e.g. by piercing with a sharp implement, so releasing the seals. A commercially available sealing member may be used such as that available from Raychem under the name "TDUX". After re-entry the parts 1, 2 of the enclosure can be re-used, although the sealing member 11 must be replaced.

The narrow portion 3 of part 1 of the enclosure helps to retain the inflated sealing 11 in the enclosure parts 1 and 2 and together with the inflated sealing means provides some strain relief for the cables 10 within the enclosure.

We claim:

1. A cable splice enclosure for a butt cable splice between at least two substantially side-by-side cables comprising:
    a first part through which the cables extend;
    a second part which is hollow and together with the first part forms a closed space, the first and second parts having internal and external cross-sections such that the second part can be slid upon and outside of the first part so as to define an overlap between the first and second parts;
    an inflatable sealing member carrying sealing material, the sealing member being within the enclosure and in contact with the cables and the overlap; and
    wherein the first part includes a wall tapered at an angle of taper at an end thereof extending within the second part at the overlap such that the wall will move outward, when the inflatable sealing member is inflated, into contact with the second part.

2. A cable splice enclosure according to claim 1 wherein the angle of taper is less than 30°.

3. A cable splice enclosure according to claim 1 in which the first part is provided with means to limit the movement of the second part towards the first part.

4. A cable splice enclosure according to claim 1 wherein the first part and the second part of the enclosure each have a circular cross-section.

5. A cable splice enclosure according to claim 1 wherein the first part has
    (a) a cable entry sub-part, which has a cross-section sufficient to receive cables to be spliced, and
    (b) a sealing sub-part, having a greater cross-sectional area for receiving the inflatable sealing member.

6. A cable splice enclosure according to claim 1 in which the inflatable sealing member extends substantially into the first and second parts.

7. A cable splice enclosure according to claim 1 wherein the first part has an opening through which the cables extend into the enclosure, which opening decreases in cross-sectional area towards the interior of the enclosure so as to guide the cables into the enclosure.

8. An environmental enclosure for at least two cables comprising:
    a first part including:
        a first portion having an opening through which the cables extend;
        a second portion having a diameter greater than the first portion;
        the second portion including a wall portion tapered at an angle at an end thereof opposite the first portion such that the wall portion will move outward, when the inflatable sealing member is inflated, into contact with a second part; and
        a rib having a diameter greater than the diameter of the second portion;
    said second part being hollow and together with the first part forming a closed space, the first and second parts having internal and external cross-sections such that the second part can be slid upon and outside of the first part so as to define an overlap between the first and second parts;
    an inflatable sealing member within the enclosure and in contact with the cables and the overlap;
    an inter-cable device positioned between the cables and having mastic leaves in an overlapping longitudinal position with the inflatable sealing member so as to be compressed by the inflatable sealing member to seal the enclosure.

9. An enclosure according to claim 8 wherein the inflatable sealing member carries a sealing material.

10. An enclosure according to claim 8 wherein the rib connects the first portion and the second portion and wherein the rib provides a means for limiting movement of the second part towards the first part.

11. An enclosure according to claim 8 wherein the opening includes an increasing diameter portion to guide the cables into the opening.

* * * * *

UNITED STATES PATENT AND TRADEMARK OFFICE
CERTIFICATE OF CORRECTION

PATENT NO. : 5,859,388
DATED : Jan 12, 1999
INVENTOR(S) : Robert James Allen

It is certified that error appears in the above-identified patent and that said Letters Patent is hereby corrected as shown below:

Cover Page, section (75) Inventors : replace all occurances of "Bulgaria" by --Belgium--
Cover Page, section (73) Assignee: replace "Bulgaria" by --Belgium--

Signed and Sealed this

Seventh Day of September, 1999

Attest:

Q. TODD DICKINSON

Attesting Officer

Acting Commissioner of Patents and Trademarks